United States Patent [19]

Smith et al.

[11] Patent Number: 5,721,949
[45] Date of Patent: Feb. 24, 1998

[54] DISK CONTROLLER HAVING SEQUENTIAL DIGITAL LOGIC IN A STATE MACHINE FOR TRANSFERRING DATA BETWEEN DMA DEVICE AND DISK DRIVE WITH MINIMAL ASSISTANCE OF THE CPU

[75] Inventors: R. Steven Smith, Saratoga; Matthew R. Nelson, Sunnyvale, both of Calif.

[73] Assignee: Apple Computer, Inc., Cupertino, Calif.

[21] Appl. No.: 863,681

[22] Filed: May 27, 1997

Related U.S. Application Data

[63] Continuation of Ser. No. 167,410, Dec. 14, 1993, abandoned.
[51] Int. Cl.$^6$ ................................................. G06F 15/40
[52] U.S. Cl. ................................................. 395/825
[58] Field of Search ................................. 395/821, 822, 395/823, 825, 842, 843, 844, 894, 427, 438

[56] References Cited

U.S. PATENT DOCUMENTS

| | | | |
|---|---|---|---|
| 4,262,332 | 4/1981 | Bass et al. | 395/441 |
| 4,380,047 | 4/1983 | Eisenhard et al. | 386/125 |
| 4,651,237 | 3/1987 | Williams | 360/48 |
| 4,730,348 | 3/1988 | MacCrisken | 375/240 |
| 4,852,045 | 7/1989 | Kraul et al. | 395/490 |
| 4,888,691 | 12/1989 | George et al. | 395/182.13 |
| 4,916,556 | 4/1990 | Sander et al. | 360/45 |
| 4,954,983 | 9/1990 | Klingman | 395/831 |
| 5,050,099 | 9/1991 | Nishihara | 395/109 |
| 5,056,010 | 10/1991 | Huang | 395/404 |
| 5,280,601 | 1/1994 | Desai et al. | 395/405 |
| 5,300,949 | 4/1994 | Rodriquez et al. | 345/202 |
| 5,347,638 | 9/1994 | Desai et al. | 395/825 |
| 5,430,859 | 7/1995 | Norman et al. | 395/430 |
| 5,436,618 | 7/1995 | Van Steenbrugge | 370/438 |
| 5,440,697 | 8/1995 | Boegel et al. | 395/500 |
| 5,588,012 | 12/1996 | Oizumi | 371/51.1 |

FOREIGN PATENT DOCUMENTS

| | | |
|---|---|---|
| 0565856A2 | 10/1993 | European Pat. Off. . |
| 0565856A3 | 10/1993 | European Pat. Off. . |
| 5104826 | 10/1991 | Japan . |

OTHER PUBLICATIONS

"Get the Font You Want", by Sharon, Phyllis, Mar. 1989, Lotus, V5, N3, p. 71(2).
"How to Print Worksheets on a Laser Jet", by Sharon, Phyllis, Mar. 1989, Lotus, V5, N3, p.68(3).

*Primary Examiner*—Moustafa M. Meky
*Attorney, Agent, or Firm*—Hickman Beyer & Weaver

[57] ABSTRACT

A method for transferring data between a host computer and peripheral storage including the steps of: (a) receiving data from the host; (b) determining if an escape command is present in the data; (c) writing the data to the a peripheral storage medium if a escape command is not present in the data; and (d) performing as least one command relative to the peripheral storage if a escape command is present in the data. Also disclosed is a method for controlling a disk drive unit including the steps of: (a) determining on a host computer a current action to be performed with a disk drive unit; (b) formatting a track of a disk engaged with a disk drive unit based upon output data provided by the host computer if the current action is a formatting action; (c) writing a sector on the disk based upon the output data provided by the host computer if the current action is a writing action; and (d) reading a sector of the disk and transferring input information to the host computer if the action is a reading action. Escape codes are used to distinguish "normal" data from "special" data. A disk drive controller of the present invention includes digital logic responsive to a data bus of the host computer and operative to develop a datatype bus based on the data bus, where the datatype bus is operative to specify one of a plurality of data types, and a converter responsive to the data bus and the datatype bus and operative to provide serial data to a disk drive unit mechanism.

32 Claims, 7 Drawing Sheets

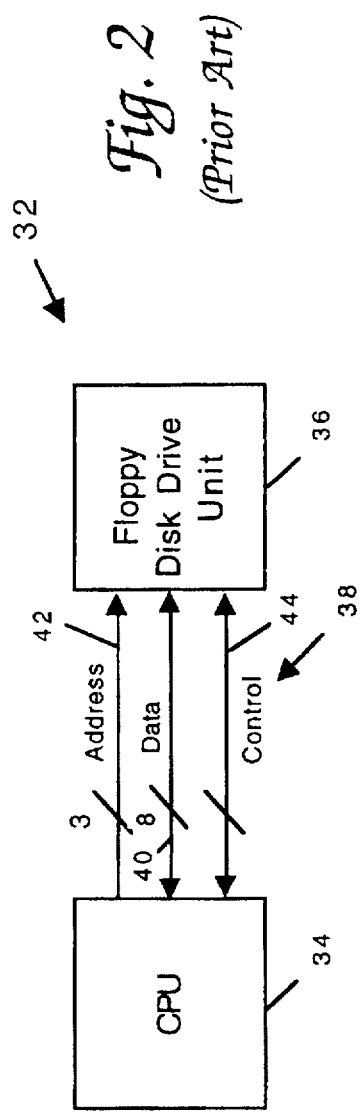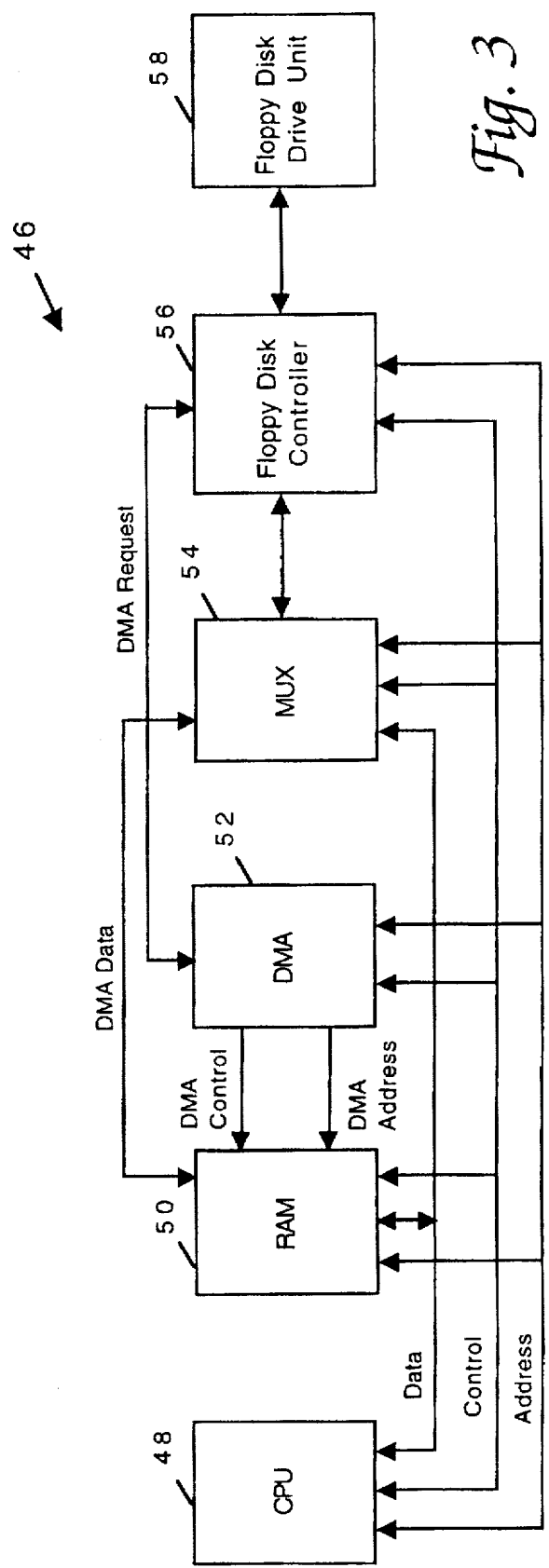

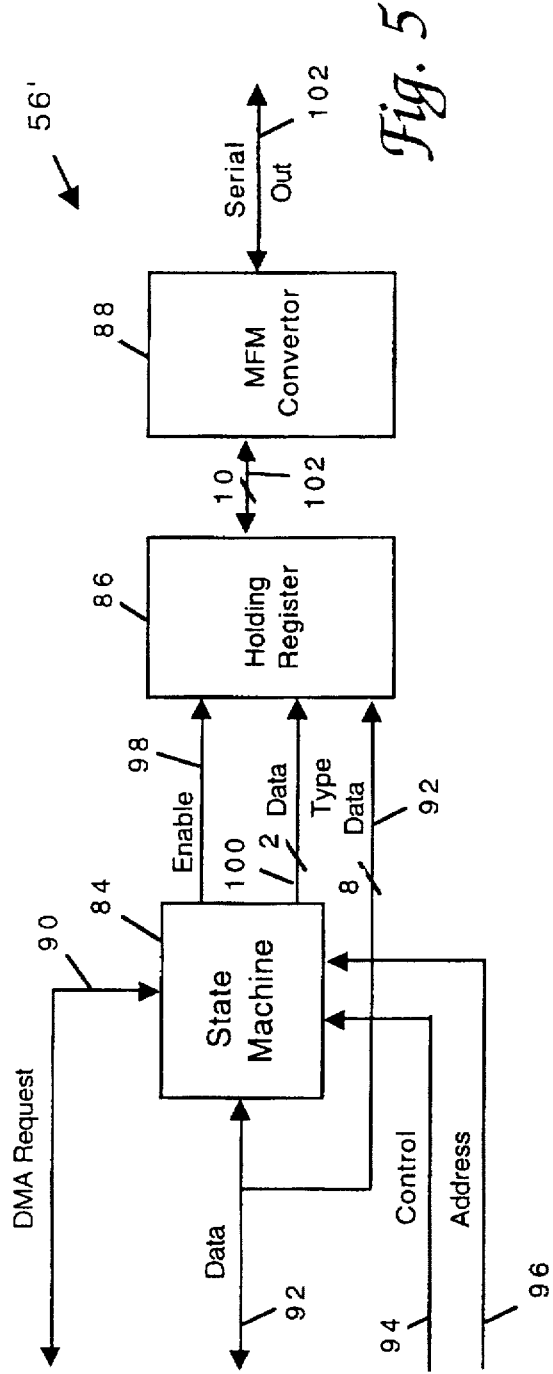
Fig. 5
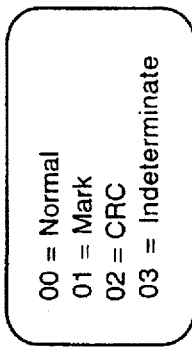
00 = Normal
01 = Mark
02 = CRC
03 = Indeterminate
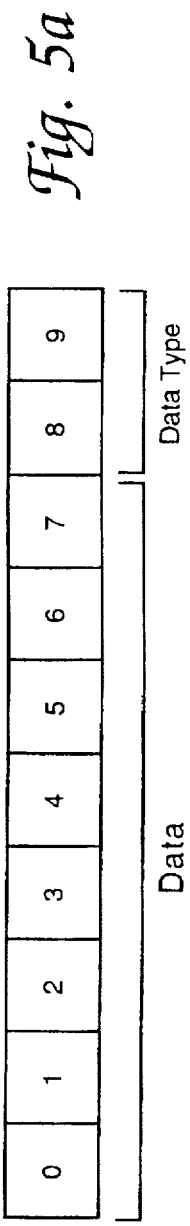
Fig. 5a

DISK CONTROLLER HAVING SEQUENTIAL DIGITAL LOGIC IN A STATE MACHINE FOR TRANSFERRING DATA BETWEEN DMA DEVICE AND DISK DRIVE WITH MINIMAL ASSISTANCE OF THE CPU

This is a continuation of application Ser. No. 08/167,410 filed Dec. 14, 1993, now abandoned.

BACKGROUND OF THE INVENTION

This invention relates generally to computer peripherals and more particularly to disk drive controllers.

General purpose digital computers are typically provided with some form of peripheral storage. A common form of peripheral storage is the "floppy" disk drive unit. A floppy disk drive unit is receptive to a flexible or "floppy" disk which is coated with a ferromagnetic material. The disk drive unit includes a motor to spin the floppy disk and a read/write (R/W) head which can magnetically encode data in the ferromagnetic material of the floppy disk, and which can subsequently read back the magnetically encoded data.

A floppy disk 10 in accordance with the prior art is illustrated in FIG. 1. Here, the floppy disk is shown without a protective casing, which is typically provided to protect the delicate floppy disk element. A floppy disk 10 is typically annular in shape and includes a non-conductive, flexible substrate 12 typically made from a material such as MYLAR™. A ferromagnetic material such as iron oxide is typically coated on both sides of the MYLAR substrate 12 to provide a magnetic recording medium. A central hole 14 is provided for engagement with a spindle of the disk drive unit motor, and an index mark or hole 16 is formed through the substrate 12 to provide positional information to the disk drive unit.

Data is typically encoded on both sides of the floppy disk 10 along a number of concentric tracks 18. On a standard 3½ inch floppy disk, there are 80 tracks 18. Each of the tracks 18 encode data in a number of sequential sectors, such as the sector 20 illustrated in FIG. 1A. Each sector 20 is separated from adjacent sector by a region 22 commonly known as "GAP1" in the industry. These regions 22 are typically provided with a pattern of bytes, such as a series of $4E bytes, where the dollar sign "$" signifies hexadecimal notation. A byte of information for most floppy disk applications is eight bits in length.

With continuing reference to FIG. 1A, a sector 20 includes an address header 24, a data header 26, a data field 28, and a trailer 30. The address header 24 typically includes a few bytes of information for synchronization and positional data. For example, address header 24 will typically include the number of the sector, the side of the disk that the sector is on, and the sector's track number. Other data, such as a format number, which represents the numbers of bytes per sector, are also included in address header 24.

The data header 26 has a primary purpose of separating the address header 24 from the data field 28. It typically does not include data, and may only be 4 bytes or so in length.

The data field 28 is used to store user or system data for subsequent retrieval. The data field 28 is typically 512 bytes in length. If a user or the system wishes to store less than 512 bytes of information, the remaining bytes are simply unused or include "garbage" data. If the user or system wishes to store more than 512 bytes of data, the additional data can be stored in another sector on the floppy disk.

The trailer 30 is often referred to as the Cyclical Redundancy Check ("CRC") region, and is primarily used for error tracking. The CRC region typically includes a two bytes of checksum information which is used to ensure the integrity of the data field.

The prior art teaches several methods for writing and reading data on a floppy disk. In a first method, the central processing unit (CPU) of a "host" computer system does most of the work. In a second method, a dedicated disk controller is used to handle most of the burden of operating the disk drive unit.

In FIG. 2, a system 32 illustrates a first method for controlling a disk drive unit. In system 32, a CPU 34 is coupled to a disk drive unit 36 by a number of buses 38 including an 8-bit data bus 40, a 3-bit address bus 42, and a 3-bit control bus 44. In this system 32, CPU 34 does virtually all the work and the disk drive unit 36 is relatively unintelligent. The disk drive unit 36 includes a number of registers which can be addressed by the address bus 42. The data on data bus 40 is handled by the disk drive unit 36 in different ways depending upon which register is addressed. For example, in the SWIM™ floppy disk controller of Apple Computer, Inc. of Cupertino, Calif., a total of 8 registers are provided. Register 0 is for normal data, while registers 1 and 2 are for "special" data. Registers 3–7 are used for other purposes. A data transfer into data register 0 will result in data from that register being written to a floppy disk engaged with disk drive unit 36. Data written to register 1 causes "special" features to be applied to the data in register 1, and data written to register 2 is ignored and will cause the disk drive unit 36 to generate an internally generated data value.

The advantage of the system 32 of FIG. 2 is its simplicity. The disk drive unit 36 is relatively simple, and few or no external integrated circuit chips are required to connect the CPU 34 to the disk drive unit. The disadvantage of the system 32 of FIG. 2. is that it places a considerable burden on CPU 34. Since CPU 34 handles all data transfers to and from the disk drive unit 36, a great many CPU cycles are required simply to control the disk drive unit. Furthermore, CPU 34 must calculate and provide all special control and format characters for the disk drive unit 36. This overhead burden on the CPU 34 can significantly degrade system performance during heavy usage of the disk drive unit 36.

A method for controlling a disk drive unit is implemented in a system 46 as seen in FIG. 3. System 46 includes a CPU 48, random access memory (RAM) 50, a direct memory access (DMA) device 52, a multiplexer (MUX) 54, a floppy disk controller 56, and a disk drive unit 58. The RAM 50 is sometimes referred to as "scratch-pad memory", although other memory storage types can also be used as temporary or scratch-pad memory. The floppy disk controller 56 can access data stored in RAM 50 via DMA 52 without having to pass the data through CPU 48. This permits very rapid access to the contents of RAM 50 by the floppy disk controller 56. The MUX 54, permits the disk controller to read data from either RAM 50 or data provided by the CPU 48.

In addition to being able to directly access the random access memory 50, the floppy disk controller is capable of producing the special codes required for the address header 24, the data header 26, and the trailer 30 (see FIG. 1A). The only data required from the CPU 48 or RAM 50 is the actual data for data field 28 of a sector 20. The disk controller 56 therefore relieves the CPU 48 of the large burden of directly controlling the disk drive unit 58 and producing the special disk drive unit codes. This can greatly enhance system performance, particularly during heavy disk drive unit usage. However, this increase in performance comes at a cost, namely the additional hardware involved with the floppy disk controller 56. The floppy disk controller 56 can add substantially to the cost of the system 46, and can occupy substantial silicon or PC board real-estate, thereby increasing the size and power requirements of the system.

An example of disk controller 56 is a number 765 floppy disk controller sold by Western Digital Corporation. Data is placed in RAM 50 by the CPU 48 and is transferred under the guidance of the DMA controller 52 to the Western Digital 765 floppy disk controller when it is required. Only "normal" data bytes need to be transferred in this way since the Western Digital 765 floppy disk controller is aware of when the "special" bytes are required and generates them internally.

While prior art floppy disk controllers perform their functions admirably, they do so at a considerable cost, both in complexity and price. For example, the Western Digital 765 floppy disk controller includes an embedded microprocessor to generate the "special" bytes and to control other operations of the controller. Prior art floppy disk controllers therefore tend to include a great number of gates, which increases their cost and size. While cost is always a negative factor, the very size of the floppy disk controller can also be a problem if it is desired to embed the floppy disk controller functionality on a larger integrated circuit die including, for example, a microprocessor function and random access memory (RAM).

The operation of a typical floppy disk controller 56, such as the aforementioned Western Digital 765 floppy disk controller, is illustrated in FIG. 4. The process 60 is, essentially, a computer implemented process operating on a microprocessor which forms a part of the floppy disk controller 56. The process 60 begins at 62 and, in a step 64, the registers are read. Next, a step 66 determines whether an action is to be performed based upon the data read from the registers and, if not, process control returns to step 64 to await new information. If step 66 determines that an action is required, process control branches depending upon the desired action. For example, if the action requested by the data stored in the registers is a "FORMAT TRACK" action, a step 68 finds the index mark (such as index mark 16 of FIG. 1) on the floppy disk 10. Next, a step 70 calculates the address header, data header, and trailer (CRC) and a step 72 causes these headers to be written to disk. Process control then returns to step 64. If the action required is "READ SECTOR", data from the floppy disk is transferred to the DMA channel in a step 74. If the action is required is "WRITE SECTOR", the sector header is found in a step 76, and the data header is calculated and written to disk in a step 78. Next, in a step 80, a fixed 512 bytes of data are written into the data field 28, and the CRC trailer is calculated and written in a step 82. Process control then returns to step 64.

The prior art has addressed the problem of floppy disk control in one of two extreme fashions. At one extreme the CPU is responsible for virtually all data transfer, which places a large burden on the functionality of the system. At the other extreme, a complex floppy disk controller is responsible for most of the control functions of the disk drive unit, but at the cost of increased system complexity, cost, and size. The problem that the prior art has not addressed, therefore, is how to simultaneously minimize CPU burden, hardware complexity, and system size while maintaining full system functionality and compatibility with existing standards.

SUMMARY OF THE INVENTION

The present invention charts a middle course between the two extremes of the prior art by providing a floppy disk controller which is small and relatively uncomplicated in design, yet which relieves the CPU of a host computer system from most disk drive unit control tasks. Computer systems implementing the present invention therefore have high system performance, are economical to build, and (in some implementations) are more compact in size.

In a broad sense, a method in accordance with the present invention for transferring data between a host and peripheral storage device includes the steps of: (a) receiving data from host: (b) determining if an escape command is present in the data; (c) writing the data to a peripheral storage medium if an a escape command is not present in the data; and (d) performing at least one command relative to the peripheral storage if an escape command is present in the data. Preferably, the step of determining whether an escape command is present in the data includes the steps of determining that a escape command is not present in the data if "escape" is disabled, and determining that an escape command is present in the data if "escape" is enabled and if the data includes a predetermined escape code. The step of performing a command preferably comprises the steps of receiving additional data from the host, and executing at least one command specified by the additional data.

More specifically, a method for controlling a disk drive unit in accordance in the present invention includes the steps of: (a) determining on a host computer a current action to be performed with a disk drive unit; (b) formatting a track of a disk engaged with the disk drive unit based upon output data provided by the host computer if the current action is a formatting action; (c) writing a sector on the disk based upon output data provided by the host computer if the current action is a writing action; and (d) reading a sector of the disk and transferring input data to the host computer if the action data is a reading action. In both the "formatting a track" and "writing a sector" steps the data includes at least one command code preceded by a escape code. More specifically, the step of writing a sector on the disk in both the formatting action and writing action includes the steps of: (a) reading a first byte of data from a direct memory access (DMA) channel of the host computer; (b) examining the first byte to determine if it is an escape code: (c) writing the first byte to disk if the first byte is not an escape code; and (d) reading a second byte of data and executing a command specified by the second byte if the first byte was a escape code. Preferably, the step of writing a sector further includes the steps of determining whether an escape is enabled prior to examining the first byte to determine if the first byte is an escape code, and writing the first byte to disk if an escape is not enabled.

A disk drive controller in accordance with the present invention includes digital logic coupled to a data bus of a host computer and operative to develop a "datatype" bus based upon data on the data bus, where the datatype bus is operative to specify one of a plurality of data types, and a converter responsive to the data bus and the datatype bus and operative to produce serial data for a disk drive unit mechanism. Preferably, the digital logic is implemented as a simple state machine rather than as a complex microprocessor. The disk drive controller also preferably includes a combining device ("holding register") for combining the data bus and the datatype bus as an expanded bus, where the converter is responsive to the expanded bus. The digital logic detects whether an escape code is present in the data on the data bus, and performs one of a number of commands in response to the detection of an escape code.

The process of the present invention is implemented on a relatively simple state machine which allows the floppy disk controller to perform most of the functions of controlling the disk drive unit. The result is a simplified hardware implementation which still relieves the CPU from the majority of the work involved in controlling a disk drive unit. Since the floppy disk controller can be implemented in relative few gates (e.g. 5000–6000 gates) it can be integrated on the same silicon as other system components, therefore allowing a higher level of integration and smaller size than systems of the prior art. The method and apparatus of the present invention therefore provides a lower cost and more compact computer system which is still capable of high system performance even during heavy disk drive unit usage.

These and other advantages of the present invention will become apparent upon reading the following detailed descriptions and studying the various figures of the drawings.

BRIEF DESCRIPTION OF THE DRAWINGS

FIG. 2 is a block diagram of a first prior art system for controlling a disk drive unit;

FIG. 3 is a block diagram of a second prior art system for controlling a disk drive unit;

FIG. 5 illustrates a floppy disk controller in accordance with the present invention;

FIG. 5a illustrates an expanded data structure used in accordance with a preferred embodiment of the present invention;

DETAILED DESCRIPTION OF THE PREFERRED EMBODIMENTS

Figure 1:
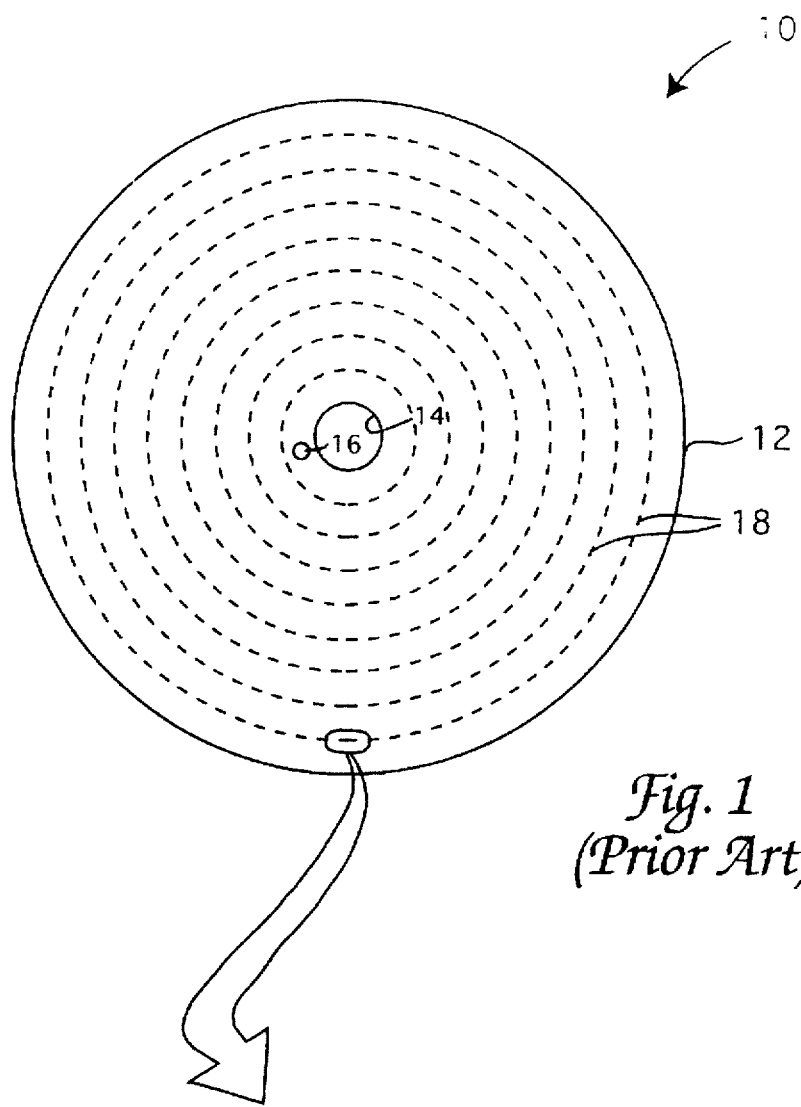
FIG. 1 is a top plan view of a floppy disk of the prior art without its jacket.
Figure 1A:
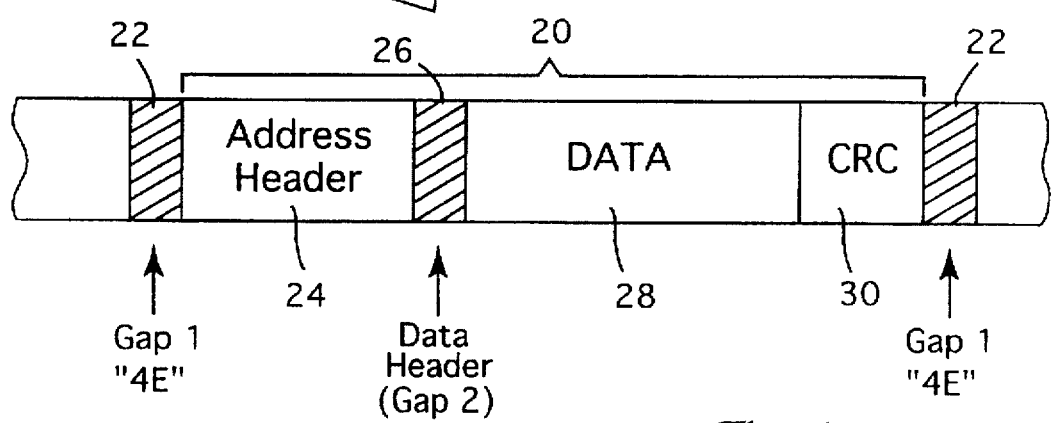
FIG. 1a illustrates the format of a single sector of the floppy disk of FIG. 1.
Figure 4:
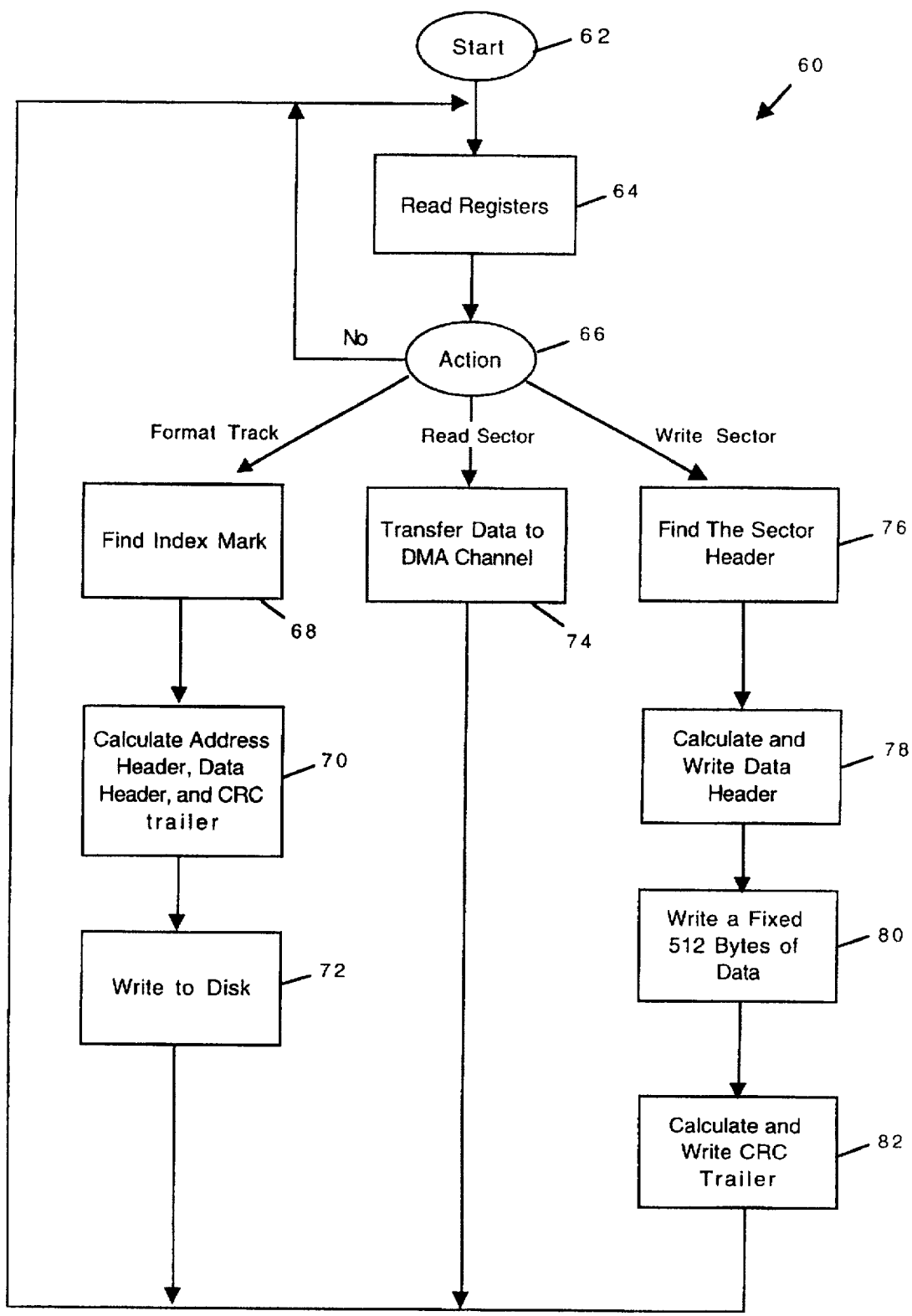
FIG. 4 illustrates a process implemented by the prior art disk drive controller 56 of FIG. 3.

FIGS. 1–4 illustrate prior art concepts relevant to the present invention. FIG. 5 is a block diagram of a floppy disk controller 56' in accordance with the present invention. This floppy disk controller 56' can be implemented in the system 46 illustrated in FIG. 3 by replacing the prior art floppy disk controller 56 with the floppy disk controller of the present invention.

In FIG. 5, the floppy disk controller of the present invention includes a state machine 84, a holding register 86, an MFM converter 88. As is well known to those skilled in the art, a state machine such as state machine 84 is a digital logic device including fairly large numbers of interconnected digital gates which, under the operation of a clock, will perform a sequence of steps based upon its current state and upon its inputs. These inputs include a DMA request line 90, a RAM data bus 92, a control bus 94, and an address bus 96. The DMA request line 90 couples the floppy disk controller 56' to a DMA device, such as DMA device 52 of FIG. 3. The data bus 92 couples the state machine 84 to the system data bus, preferably via a multiplexer such as MUX 54 of system 46 as illustrated in FIG. 3. Buses 94 and 96 are the control bus and address bus, respectively, of the computer system.

The state machine 84 has an output on an enable line 98 and a 2-bit datatype bus 100. Enable line 98, datatype bus 100, and the data bus 92 all serve as inputs to the holding ("combining") register 86. Holding register 86 is essentially a 10-bit latch register which latches in data from datatype bus 100 and data bus 92 when enabled by enable line 98. The output of the holding register 86 is produced on an expanded 10-bit bus 102.

Converter 88 is preferably an MFM converter of a type well known to those skilled in the art. The converter 88 can also be a GCR converter, or a combination MFM/GCR converter. "MFM" stands for "Modified Frequency Modulation", and is an industry standard commonly used on both IBM-compatible and Apple Macintosh computers. "GCR" stands for "Group Code Recording", and is a standard used on Apple-II and Macintosh computers from Apple Computer, Inc. of Cupertino, Calif. The MFM format supports higher storage densities, and is currently the preferred floppy disk storage format. The output of the converter 88 includes serial data on a line 102 which is used by a disk drive unit to magnetically encode a floppy disk medium.

FIG. 5a illustrates the contents of the holding register 86 and, therefore, the data on bus 102 of FIG. 5. The data structure 104 is preferably a 10-bit byte include 8 bits of data and 2 bits of datatype. The 8 bits of data are stored in locations 0–7, and the two bits of datatype are stored in locations 8 and 9. When bits 8 and 9 store the values "00", the data in bits 0–7 are considered to be "normal". When bits 8 and 9 are "01", the data in bits 0–7 are considered to be "mark" data. Mark data is a special code written at the start of the address and data fields to provide positional information on a subsequent read of those fields. When bits 8 and 9 have the value "10", the data in bits 0–7 are considered to be CRC data, and values of "11" in bits 8 and 9 would indicate an indeterminate state. In the current implementation, the value in bits 8 and 9 would never be "11" because the state machine 84 would never produce a datatype "11" on bus 100.

Figure 6:
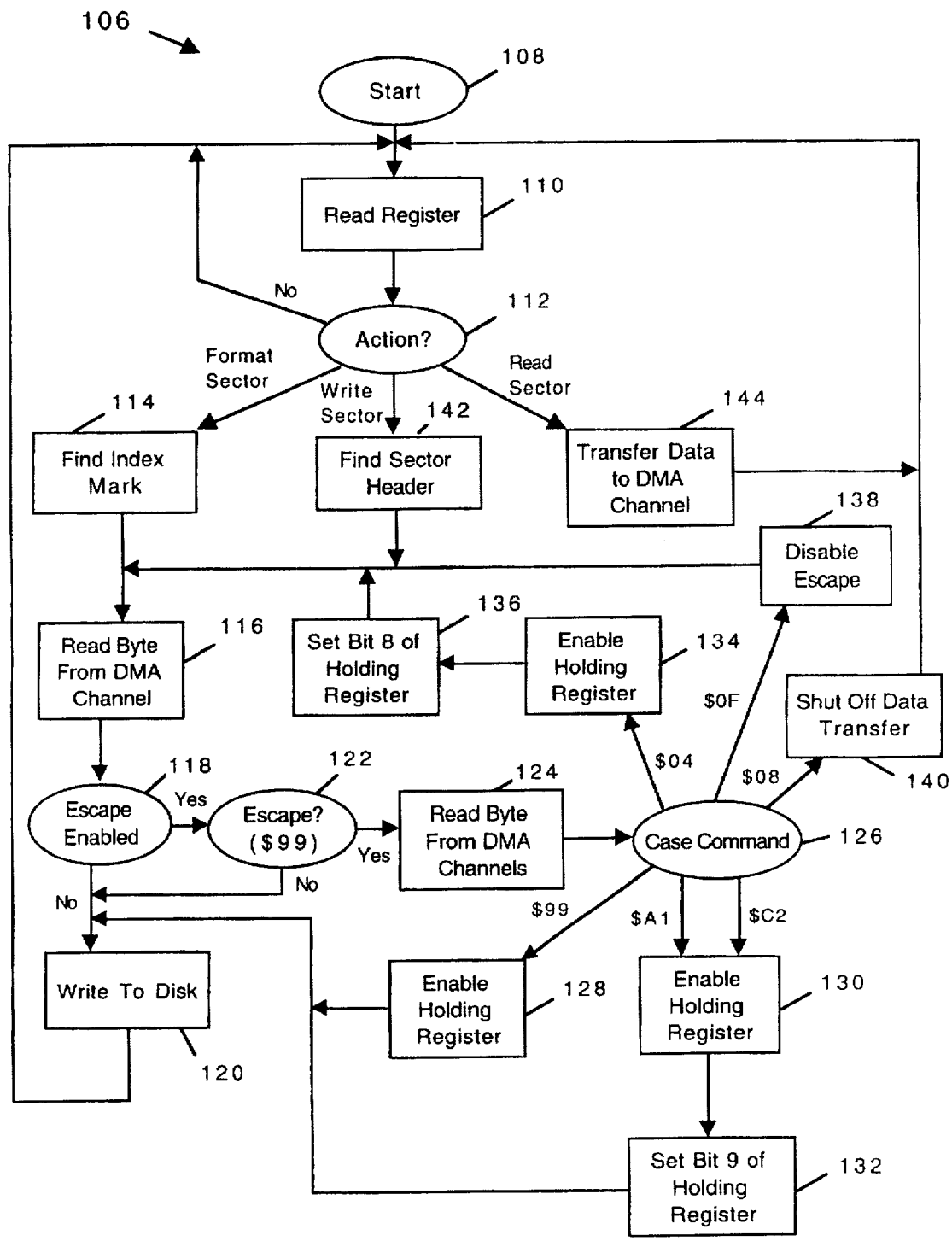
FIG. 6 illustrates a process implemented by the disk drive controller of the present invention for transferring data between a host computer and a peripheral storage device.

FIG. 6 illustrates the process implemented by the floppy disk controller 56' of FIG. 5. The process 106 begins at 108 and, in a step 110, state machine 84 reads a register associated with the state machine which holds possible actions to be taken by the state machine. Next, in a step 112, it is determined whether an action is required based upon the content of the register. If not, process control returns to step 110 to await new data to be entered into the register.

There are three basic functions performed by the floppy disk controller 56', namely, "FORMAT SECTOR", "WRITE SECTOR", and "READ SECTOR". If the action detected by step 112 is "FORMAT SECTOR", a step 114 finds the index mark on the floppy disk, such as the index mark 16 on the floppy disk 10 of FIG. 1. Next, in a step 116, a byte of data is read from the DMA channel, i.e., is read from the data bus 92 of FIG. 5. Next, in a step 118, it is determined whether the escape is enabled. If not, the byte that was read from the DMA channel in step 116 is written to disk in a step 120. Process control then returns to step 110.

If step 118 determines that the escape is enabled, it is determined in a step 122 whether the byte read from the DMA channel in step 116 is an escape code. As used herein, an escape "code" is a predetermined value or bit-pattern which signifies that the next successive byte will be a command code. As also used herein, the term "escape command" includes the combination of steps 118 and 122, i.e. an escape command is only detected if "escape" is enabled and if an escape code is detected.

In the present invention, the escape code is $99, where the $ signifies that the value 99 is in base 16 (hexadecimal). In other words, the bitpattern indicated by $99 is 10011001. This escape code is somewhat arbitrary, although it is preferred not to use a numeric value for an escape code which would commonly show up in data, such as $00 or $01.

If an escape code is detected by step 122, a byte of data is read from the DMA channel in a step 124. At this point, state machine 84 of controller 56' enters a "case command" state 126. The case command branches the process dependent upon the second byte which was read from the DMA channel. In other words, if an escape code is found in a first byte by step 122, the case command step 126 examines a second byte read by step 124 to determine the appropriate command to execute.

If step 126 detects a $99 in the second byte read by step 124, the holding register 86 is enabled in step 128 and process control returns to step 120. The command $99 indicates that the first byte which was read in step 116 was not actually an escape command but was a byte of data to be written to disk which just happened to have the same value as the escape code. Therefore, this value (which in this case is $99) is simply written to disk as data. If step 126 detects a $A1 or a $C2, the holding register 86 is enabled in a step 130, and bit 8 of the holding register is set in a step 132. This step 132 is implemented by placing a datatype "01" on datatype bus 100 of FIG. 5. By setting bit 9, the floppy disk controller 56' is causing a "mark" byte to be written to the disk medium. In the present embodiment, the mark byte is either an $A1 byte or a $C2 byte. The purpose and functionality of the $A1 mark byte and the $C2 mark byte, as is well known to those skilled in the art, is to identify the start of the address and data fields.

If the step 126 detects a $04 command code, the holding register 86 is enabled in a step 134 and, in a step 136, bit 8 of the holding register is set to indicate that the CRC bytes are to be written to disk. Bit 8 of holding register 86 is set by placing the data "10" on the datatype line 100 prior to the enabling step 134. Process control is then returned to step 116 to read the CRC bytes from the DMA channel.

The holding register, after being enabled by steps 128, 130, or 134, is disabled by step 122. However, the holding register is enabled most of the time because the detection of an escape code by step 122 is a relatively rare occurrence. The bits 8 and 9 that were set in steps 136 and 132, respectively, are cleared when any non-special data is moved into the holding register. The CRC bytes are computed by the state machine 84 upon the detection of a command stored in RAM by the CPU.

If step 126 detects a $0F command code, the escape is disabled in a step 138 and process control is returned to step 116. In the present implementation, a $0F command code will disable escape for the next 512 bytes. Therefore, the $0F code is typically the last byte of the data header 26 and prevents the process 106 from examining the next 512 bytes of data in data field 28 where (supposedly) no escape code should ever be present. This can be easily accomplished by setting a disable register to the value 512, and decrementing this value by one after each write to the disk step 120 until it reaches the value 0, at which time the escape is once again enabled.

Finally, if step 126 detects the command code $08, data transfer is terminated in a step 140 and process control is returned to step 110. When the $08 command code has been detected, a complete sector 20 has been written to disk. Therefore, the last command code in the CRC trailer region 30 is typically the $08 command code.

If the action detected by step 112 is "WRITE SECTOR", a step 142 finds the appropriate sector header, and then process control is turned over to step 116 to implement the process as previously described with regard to the "FORMAT SECTOR" action. Finally, if the action detected by step 112 is "READ SECTOR", data is transferred to the DMA channel in a step 144, and process control is returned to step 110. The "READ SECTOR" action is fairly standard, and its implementation is well known to those skilled in the art.

Figure 7:
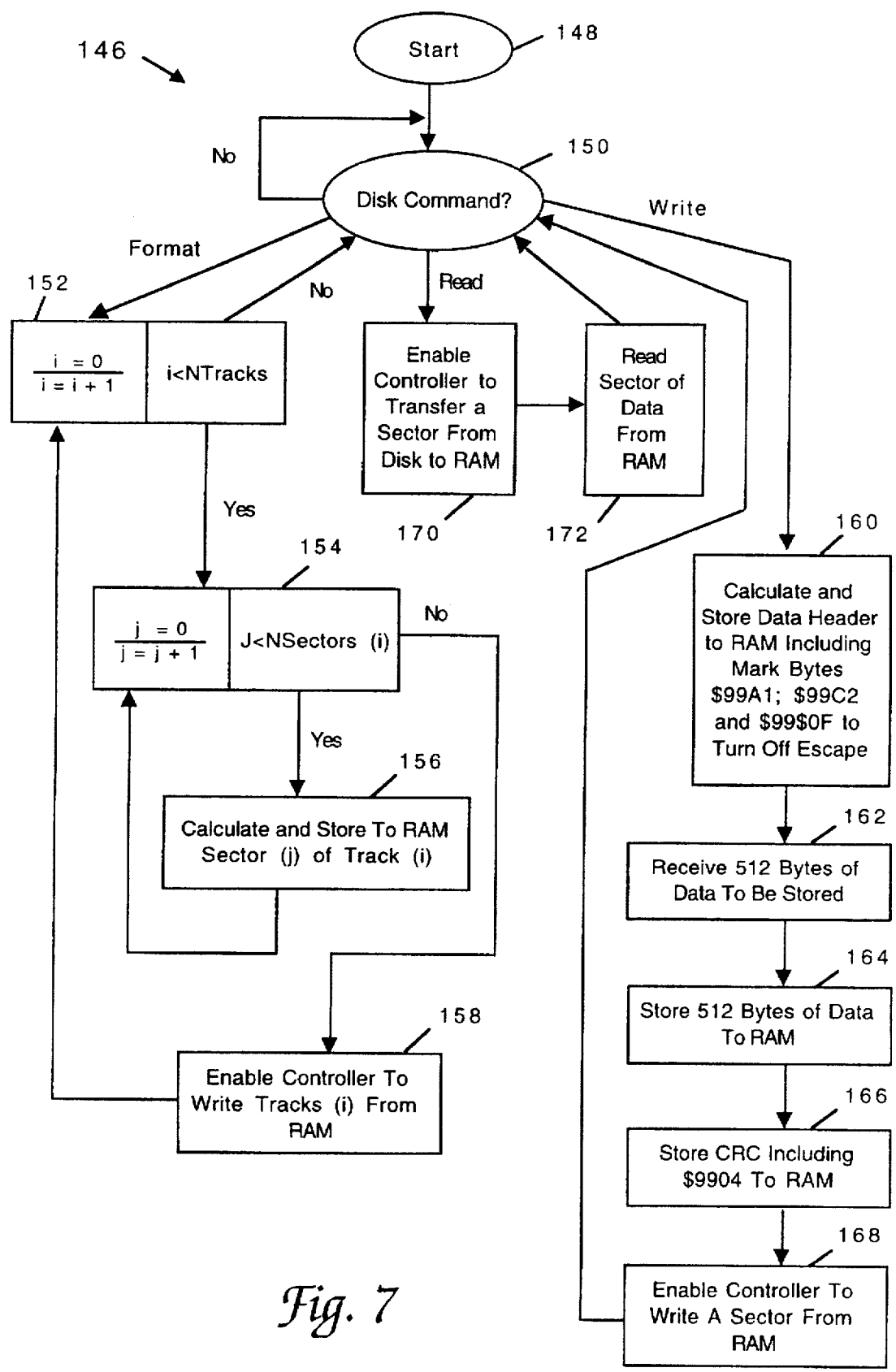
FIG. 7 illustrates a process implemented by the host computer to transfer data with the peripheral storage device.

In FIG. 7, a computer implemented process 146 designed to operate on a digital processor such as CPU 48 of FIG. 3 is illustrated in flow diagram form. The process 146 begins at 148 and, in a step 150, it is determined whether a disk command is present. If not, the step 150 goes into a "wait state" by looping back on itself until a disk command is detected. If a "FORMAT" disk command is detected by step 150, an iterative loop step 152 initializes a counter i to 0, and compares the counter i to the number of tracks NTRACKS of the floppy disk to be formatted. As described previously, for a 3½ inch floppy disk the number of tracks NTRACKS is 80. If the variable i is less than NTRACKS, an iterative loop step 154 initializes a second counter j to 0, and compares the counter j to the number of sectors NSECTORS in the ith sector. If j is less than NSECTORS(i), a step 156 calculates and stores to RAM SECTOR(j) of TRACK(i). Process control then returns to iterative loop step 154 to increment the counter j.

When the counter j is greater than or equal to NSECTORS (i), a step 158 enables the controller to write TRACK(i) from the RAM. The process control is then return to step 152 to iterate counter i. The loop of steps 152–158 is repeated until the counter i is greater than or equal to NTRACKS, at which time process control returns to step 150 to await another disk command.

If step 150 detects a "WRITE" command, a step 160 calculates and stores the data header to RAM including the mark bytes $99A1, and $99C2. A $99$0F is also stored in RAM to turn off escape. Next, in a step 162, 512 bytes of data are received from an application program, utility, or other system function and, in a step 164, the 512 bytes of data are stored to RAM. Next, in a step 166, the CRC checksum data is stored to RAM including $9904 command. Finally, a step in 168, the controller is enabled to write a sector from RAM to the magnetic disk medium. Process control then returns to step 150.

If step 150 detects a "READ" command, the controller 56' is enabled to cause a transfer of a sector of data from the disk drive unit 58 to the RAM 50. This is accomplished by searching the disk until the desired sector is found, and then transferring it by way of the DMA channel. Next, process 146 reads the sector of data from RAM in a step 172 for use by an application program, utility, or other system function.

Figure 8:
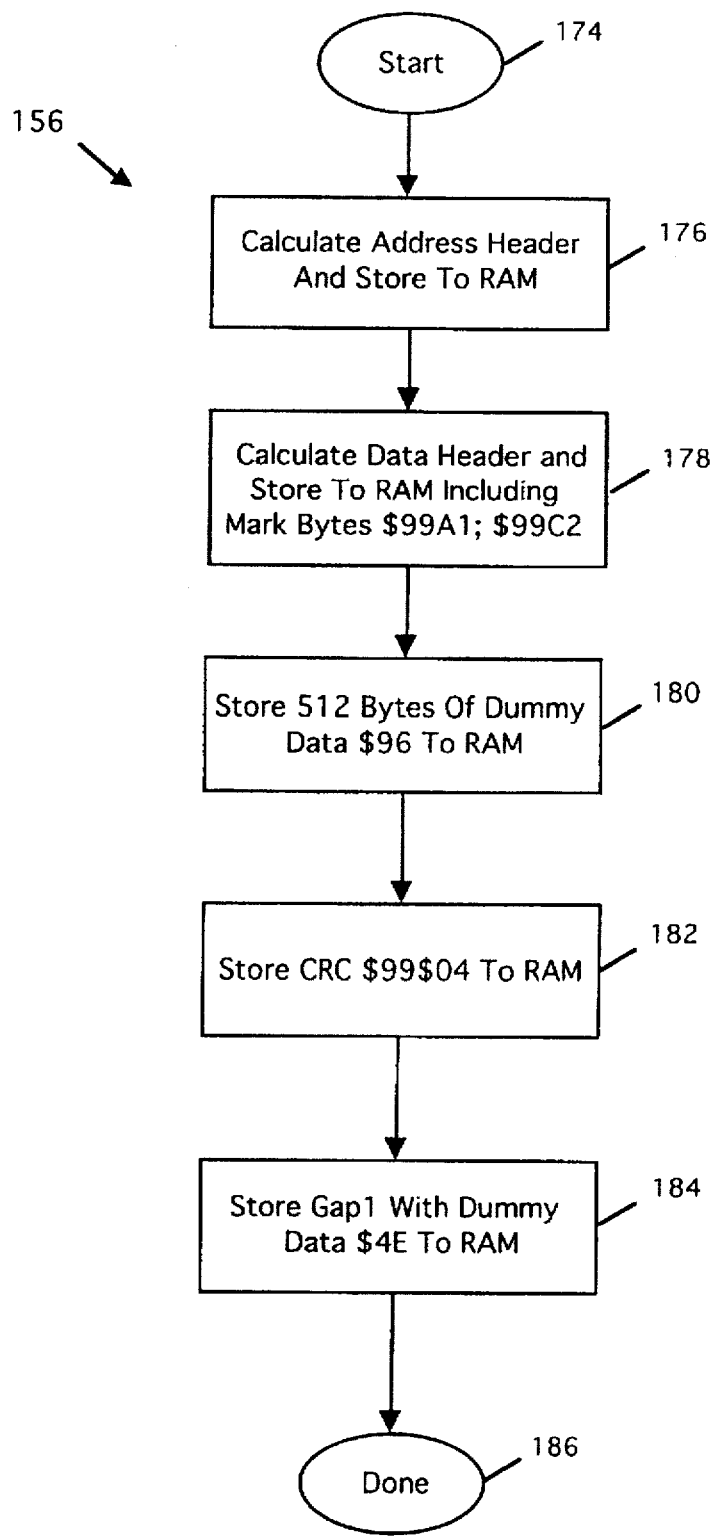
FIG. 8. illustrates the "CALCULATE AND STORE TO RAM SECTOR(j)" step of FIG. 7 in greater detail.

In FIG. 8, step 156 of FIG. 7 is discussed in greater detail. Process 156 begins at 174 and, in a step 176, the address header is calculated and stored to RAM. In a step 178, the data header is calculated and stored to RAM including the mark bytes $99A1 and $99C2. Next, in a step 180, 512 bytes of dummy data are stored to RAM. Typically, the dummy data comprises an arbitrary hexadecimal number such as $96. In the present invention, 512 bytes of data are stored in step 180 because this is the standard number of bytes stored in a sector on a 3½ inch floppy disk. Alternatively, for other disk formats, a different number of bytes of dummy data can be stored to RAM in step 180. Next, in a step 182, the CRC bytes including the $99$04 command are stored to RAM and, in a step 184, the GAP1 data is stored to RAM. Typically, the GAP1 data is dummy data such as an arbitrary hexadecimal number $4E. The process 156 is then completed at 186.

While this invention has been described in terms of several preferred embodiments, there are alterations, permutations, and equivalents which fall within the scope of this invention. It should also be noted that there are may alternative ways of implementing both the process and apparatus of the present invention. It is therefore intended that the following appended claims be interpreted as including all such alterations, permutations, and equivalents as fall within the true spirit and scope of the present invention.

What is claimed is:

1. A method for transferring data between a host and peripheral storage under the control of a state machine, said host including a central processing unit (CPU), memory means and a direct memory access (DMA) channel coupled to said memory means, said method comprising the steps of:

receiving data from said host via said DMA channel, said data being received by a state machine;

determining whether escape is enabled and whether said data includes a predetermined escape code using sequential digital logic of said state machine and with minimal assistance from said CPU of said host;

determining that an escape command is present in said data using sequential digital logic of said state machine when escape is enabled and when said data includes a predetermined escape code, and determining that an escape command is not present in said data when escape is disabled;

writing said data to a peripheral storage medium if an escape command is not present in said data under the control of said state machine; and performing at least one command relative to said peripheral storage if an escape command is present in said data under the control of said state machine.

2. A method for transferring data as recited in claim 1 wherein said step of writing said data comprises writing said data to a magnetic peripheral storage medium.

3. A method for transferring data as recited in claim 2 wherein said magnetic peripheral storage medium comprises a magnetic disk.

4. A method for transferring data as recited in claim 1 wherein said step of performing a command comprises the steps of:

receiving additional data from said host; and executing at least one command specified by said additional data.

5. A method for transferring data as recited in claim 4 wherein said step of executing a command comprises the steps of:

parsing said additional data into one command of a plurality of commands; and executing said one command.

6. A method for transferring data as recited in claim 5 wherein said plurality of commands include:

a transfer data command;

a write mark command; and a write trailer command.

7. A method for transferring data as recited in claim 6 wherein said plurality of commands further include:

an escape disabling command; and an end data command.

8. A method for controlling a disk drive unit using a state machine comprising the steps of:

(a) determining on a host computer a current action to be performed with a disk drive unit, said host computer including a central processing unit (CPU) coupled to said state machine;

(b) formatting a track of a disk engaged with said disk drive unit based upon output data provided by said host computer if said current action is a formatting action, said step of formatting a track including the step of writing a portion of said output data to a sector on said disk, where said output data includes at least one command code preceded by an escape code, wherein said escape code and said command code are processed by sequential digital logic of a state machine located between said host computer and said disk drive unit;

(c) writing a sector on said disk based upon output data provided by said host computer via a direct memory access (DMA) channel if said current action is a writing action, a portion of said output data being written to said sector, where said output data includes at least one command code preceded by an escape code, wherein said escape code and said command code are processed by sequential digital logic of said state machine located between said host computer and said disk drive unit with minimal assistance from said CPU;

(d) reading input data from a sector of said disk and transferring said input data to said host computer via a direct memory access (DMA) channel if said action is a reading action, said transferring occurring under control of said state machine with minimal assistance from said CPU.

9. A method for controlling a disk drive unit as recited in claim 8 wherein said step of writing a sector on said disk in both said formatting action and said writing action comprises the steps of:

(a) reading a first byte of data from a direct memory access (DMA) channel of said host computer;

(b) examining said first byte to determine if it is an escape code;

(c) writing said first byte to disk if said first byte is not an escape code; and (d) reading a second byte of data and executing a command specified by said second byte if said first byte was an escape code.

10. A method for controlling a disk drive unit as recited in claim 9 wherein said step of writing a sector further includes the steps of determining whether escape is enabled prior to examining said first byte to determine if said first byte is an escape code, and writing said first byte to disk if escape is not enabled.

11. A method for controlling a disk drive unit as recited in claim 9 wherein said second byte includes a selected command code of a plurality of command codes.

12. A method for controlling a disk drive unit as recited in claim 11 wherein if said selected command code is the same as said escape code, said selected command code is written to disk.

13. A method for controlling a disk drive unit as recited in claim 11 wherein said plurality of command codes include commands to write marks and trailers.

14. A method for controlling a disk drive unit as recited in claim 11 wherein said plurality of command codes include commands to disable escape and to end data transfer.

15. A method for controlling a disk drive unit as recited in claim 11 wherein said escape code is $99.

16. A method for controlling a disk drive unit as recited in claim 15 wherein said plurality of command codes include the following commands:

| Command Code | Command Description |
|---|---|
| $99 | Transfer data $99 (null command) |
| $A1 | Write an $A1 mark byte |
| $C2 | Write a $C2 mark byte |
| $04 | Write both CRC (trailer) bytes |
| $0F | Turn off escaping for 512 bytes |
| $08 | End data (terminate DMA transfer) |

17. A computer system with peripheral storage comprising:
   digital processing means;
   scratch-pad memory means coupled to said digital processing means;
   peripheral storage control means coupled to said scratch-pad memory means, said peripheral storage control means being responsive to real data and special data, said peripheral storage control means including sequential digital logic of a state machine which is operative to process escape codes contained in said real data;
   peripheral storage means coupled to said peripheral storage control means such that data can be transferred between said scratch-pad memory means and said peripheral storage means under control of said peripheral storage control means with minimal assistance from said digital processing means; and
   process control means operating on said digital processing means for storing data in said scratch-pad memory means, wherein said data includes both said real data and said special data, said special data being preceded by at least one escape code, wherein data derived from said real data may be written to said peripheral storage means by said peripheral storage control means, and wherein data derived from said special data may also be written to said peripheral storage by said peripheral storage control means.

18. A computer system with peripheral storage as recited in claim 17 wherein said peripheral storage means comprises a magnetic storage unit including a magnetic storage media, and wherein said process control means is operative to store data in said scratch-pad memory means including special data for said peripheral storage control means to cause said peripheral storage control means to format said magnetic media.

19. A computer system with peripheral storage as recited in claim 18 wherein data is stored on said magnetic media in a plurality of tracks, each of which is comprised of a plurality of sectors, and wherein said process control means is operative during formatting to store sufficient data in said scratch pad memory to allow said peripheral storage control means to format a track of said magnetic media.

20. A computer system with peripheral storage as recited in claim 19 wherein said process control means is further operative to read data from said scratch pad memory means which had been previously stored in said peripheral storage means.

21. A process for transferring data under control of a state machine between a host computer and a magnetic disk medium comprising the steps of:
   detecting the existence of a disk command originated by said host computer, said host computer including a central processing unit (CPU) coupled to said state machine;
   upon the detection of a format disk command, calculating and storing format data to scratch-pad memory and subsequently using said format data to format a track on said disk utilizing sequential digital logic of said state machine to format said track;
   upon the detection of a write disk command, calculating and storing write data to said scratch pad memory comprising a data header information, a number of bytes of real data, and trailer information, and subsequently using the write data stored in said scratch pad memory to write a sector on said disk, utilizing sequential digital logic of said state machine to write said sector with minimal assistance from said CPU; and
   upon the detection of a read disk command, transferring a sector of read data from said disk to said scratch pad memory utilizing sequential digital logic of said state machine with minimal assistance from said CPU.

22. A process for transferring data as recited in claim 21 wherein said calculation and storage of format data and said calculation and storage of write data includes the storage of special data preceded by an escape code.

23. A disk drive controller comprising:
   sequential digital logic in a state machine responsive to a data bus and other inputs of a host computer, said host computer including a central processing unit (CPU) and a direct memory access (DMA) device, said sequential digital logic being operative to develop a datatype bus based upon data on said data bus and said other inputs, where said datatype bus specifies one of a plurality of data types, said sequential digital logic being operative to process an escape code present on said data bus such that said sequential digital logic serves to assist in controlling a disk drive unit mechanism with minimal assistance from said CPU, said sequential digital logic being further operative to transfer data between said DMA device and said disk drive unit mechanism with minimal assistance from said CPU;
   a register for combining said data bus and said datatype bus into an expanded bus such that said expanded bus includes said data bus and said datatype bus in parallel; and
   converter means responsive to said expanded bus, such that said expanded bus serves as an input to said converter means, said converter means being operative to provide serial data developed from said expanded bus to said disk drive unit mechanism.

24. A disk drive controller as recited in claim 23 wherein said converter means comprises an MFM converter.

25. A disk drive controller as recited in claim 23 wherein said sequential digital logic includes:
   means for detecting whether an escape code is present in said data on said data bus; and
   means for performing one of a plurality of commands in response to the detection of an escape code.

26. A disk drive controller as recited in claim 25 wherein at least one of said commands controls the data present on said datatype bus.

27. A disk drive controller as recited in claim 25 wherein said data types include Normal, Mark, and CRC data types.

28. A disk drive controller as recited in claim 27 wherein said data types include the following:

| Data Type Code | Date Type Description |
|---|---|
| 00 | Normal Data |
| 01 | Mark Data |
| 10 | CRC Data |
| 11 | Indeterminate |

29. A disk drive controller as recited in claim 25 wherein said plurality of commands comprises:

a transfer data command;

a write a mark byte command; and a write a trailer byte (CRC) command.

30. A disk drive controller as recited in claim 29 wherein said plurality of commands further comprise:

an escape disabling command; and an end data command.

31. A disk drive controller as recited in claim 25 wherein said escape code is $99.

32. A disk drive controller as recited in claim 31 wherein said plurality of command codes include the following commands:

| Command Code | Command Description |
|---|---|
| $99 | Transfer data $99 (null command) |
| $A1 | Write an $A1 mark byte |
| $C2 | Write a $C2 mark byte |
| $04 | Write both CRC (trailer) bytes |
| $0F | Turn off escaping for 512 bytes |
| $08 | End data (terminate DMA transfer) |

* * * * *